Feb. 16, 1943.　　　　T. G. NELSON　　　　2,311,565
FRUIT DEJUICING APPARATUS
Filed June 7, 1941　　　　4 Sheets-Sheet 1
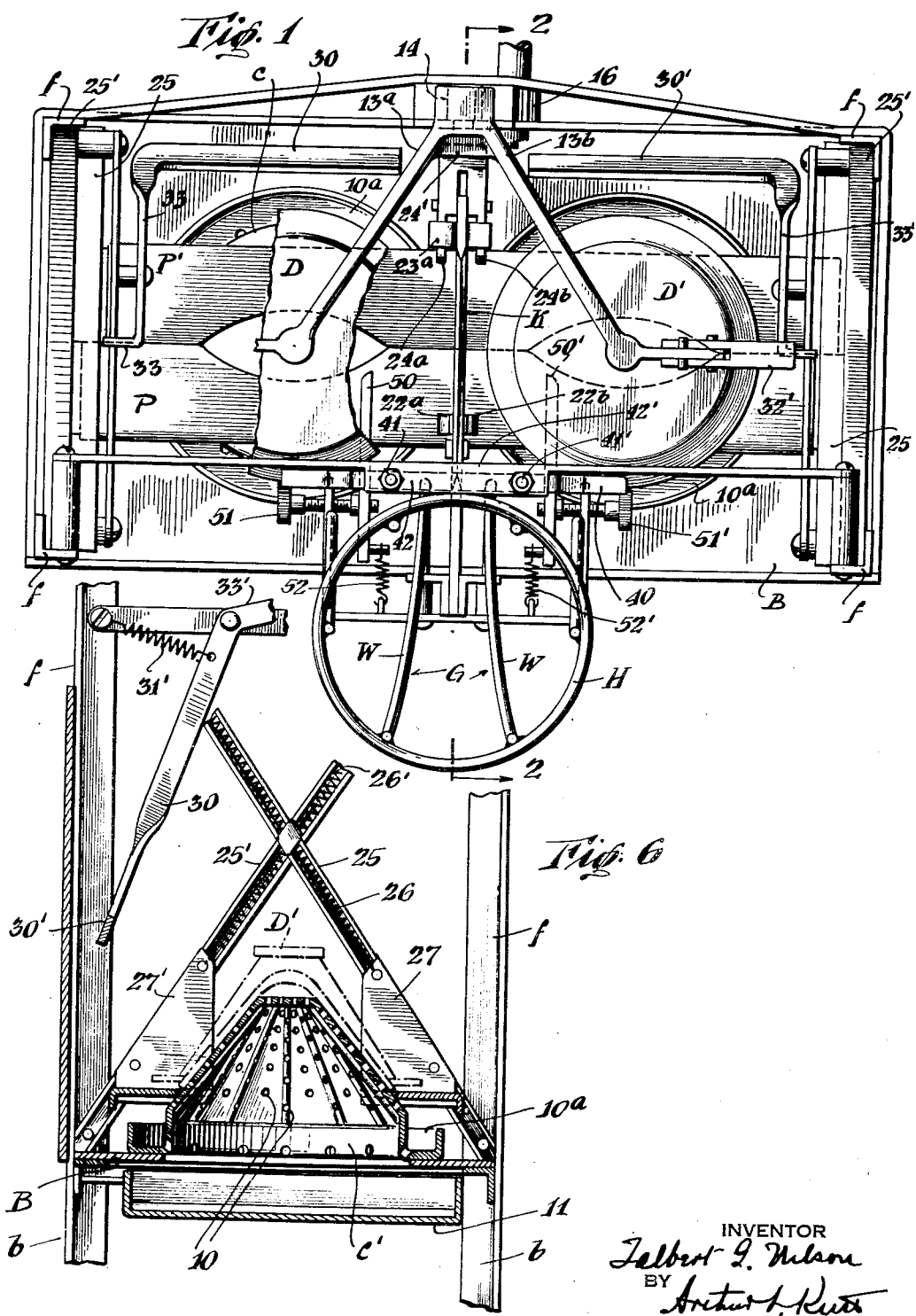
INVENTOR
Talbert G. Nelson
BY
Arthur L. Kurtz
his ATTORNEY

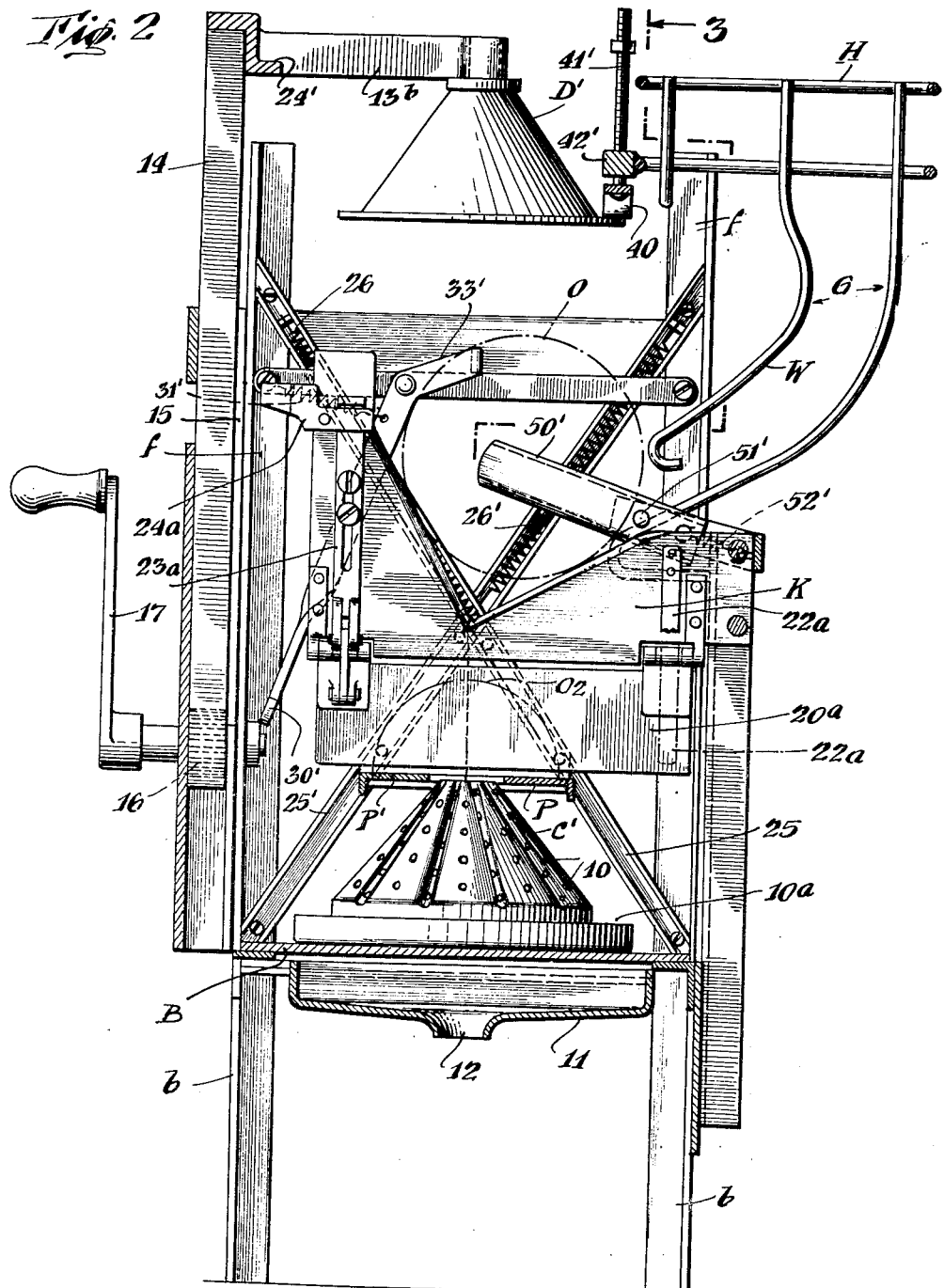

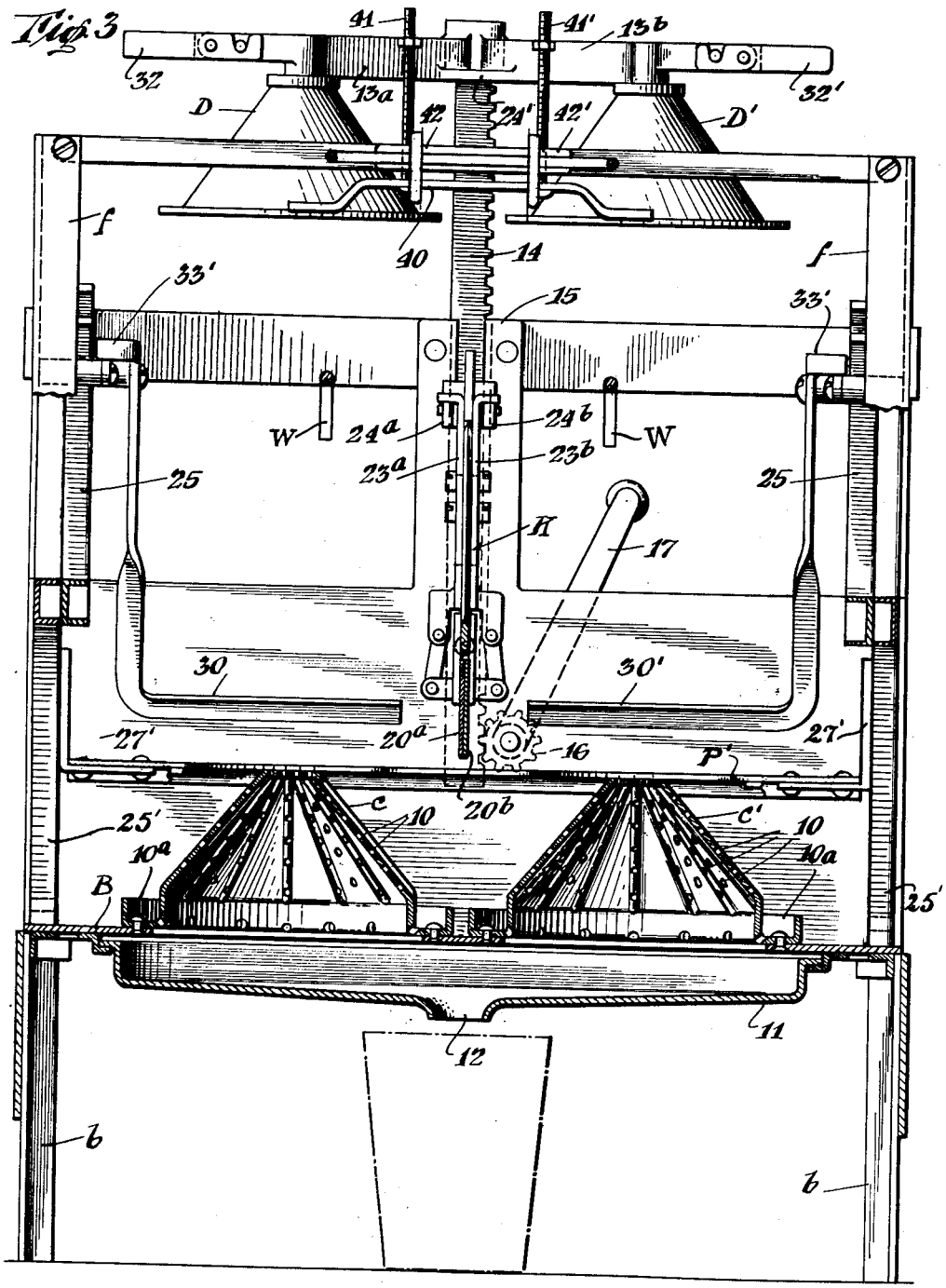

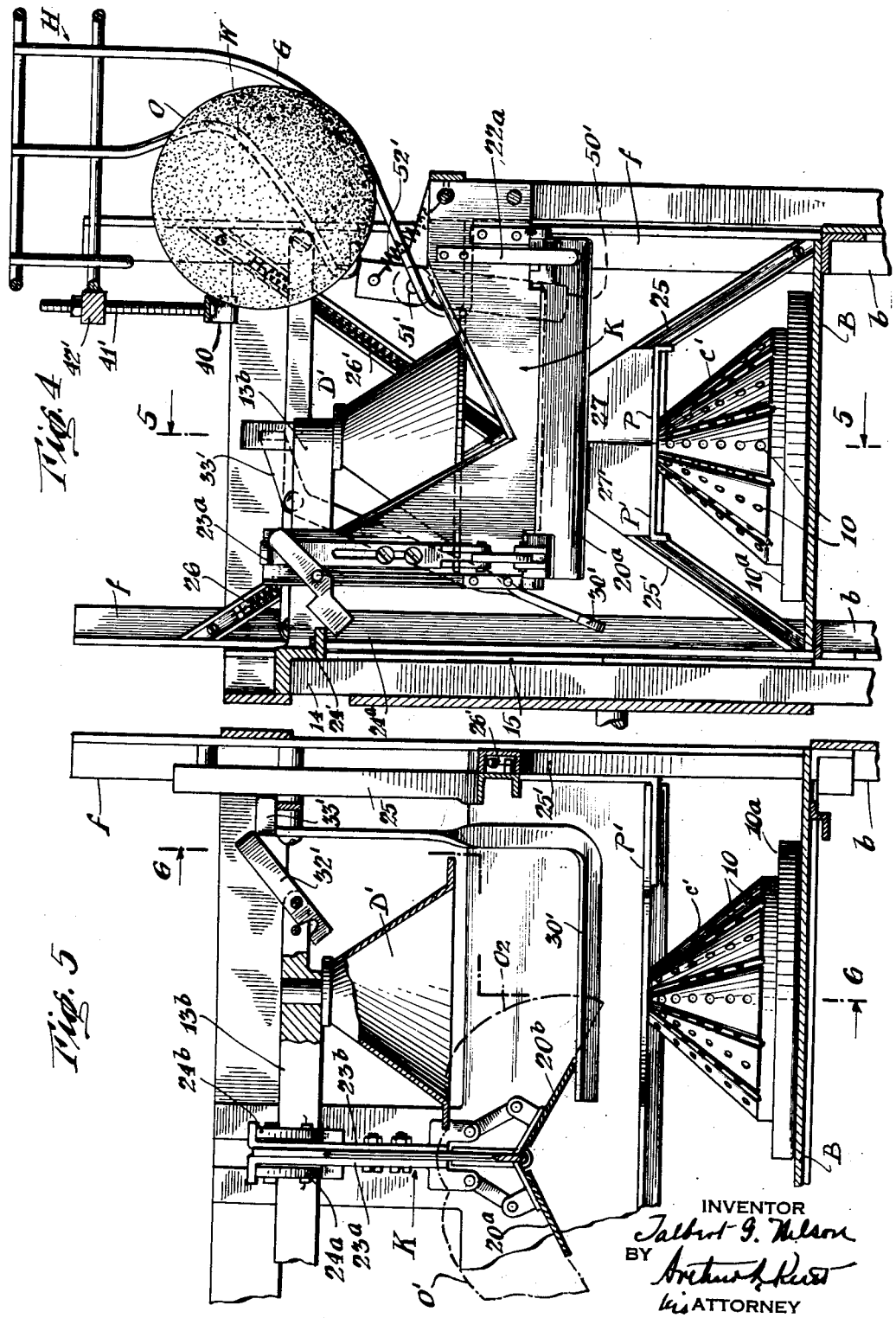

Patented Feb. 16, 1943

2,311,565

UNITED STATES PATENT OFFICE 2,311,565

FRUIT DEJUICING APPARATUS

Talbert G. Nelson, New York, N. Y.

Application June 7, 1941, Serial No. 396,988

4 Claims. (Cl. 100—42)

This invention relates to fruit squeezing, or de-juicing, apparatus, and more particularly to apparatus adapted to cut and squeeze, or de-juice, citrus fruits, such as oranges, lemons, grapefruit and the like.

In the production of orange juice on a relatively large scale, the manual performance of the operations of cutting the fruit into halves and inserting the said halves in a squeezing or other de-juicing device is tedious, uneconomic, inconvenient and unsanitary. The object of the present invention is to provide a device adapted to automatically and sequentially perform the operations of positioning the fruit with relation to cutting means, cutting the fruit into halves, positioning the halves with relation to the de-juicing means, de-juicing the halves and discharging the de-juiced halves and the expressed juice separately from the apparatus. Another object is to provide a fully automatic citrus fruit de-juicing apparatus. Other objects and advantages will be apparent as the invention is more fully hereinafter disclosed.

In accordance with the above objects, I have devised a citrus fruit de-juicing apparatus, one specific embodiment of which is illustrated in the accompanying drawings, wherein:

Fig. 1 is a top view of the present apparatus;

Fig. 2 is a sectional view of the same along plane 2—2 of Fig. 1;

Fig. 3 is a sectional view along plane 3—3 of Fig. 2;

Fig. 4 is an end view partly in section;

Fig. 5 is a partial sectional view along plane 5—5 of Fig. 4; and

Fig. 6 is a sectional view along plane 6—6 of Fig. 5.

Referring to the drawings, the specific embodiment illustrated is one adapted for the squeezing of oranges and to perform automatically the operations of feeding a plurality of oranges successively into the device, to cut each orange in half, to squeeze the juice out of each half, to eject the squeezed orange halves and to discharge the orange juice obtained, and to repeat these operations successively on each orange fed into the device.

The machine illustrated comprises essentially a base B supported on legs b and supporting thereon frame f for the several mechanisms and means of the machine.

Base B preferably is rectangular substantially as shown and supports a pair of stationary hollow male cone members C—C' provided with a plurality of perforations or drainage openings 10 therein and mounted in horizontal spaced relation on said base in any convenient manner. Base B is open beneath each cone member and beneath it there is a catch basin 11 provided with a drainage spout 12 into which basin liquid may drain from the drainage openings 10 in cone members C—C' and from gutters 10a at the base of the cone members.

Above base B, there is a pair of female cone members D—D' supported in horizontal spaced relation with their cone axes in alignment with the axes of cones C—C' and arranged to be simultaneously reciprocated along a determined vertical path of travel from an upper rest position, shown in Fig. 2, to a lower position nesting the cones D—D' in close spaced relationship over cones C—C', as shown in Fig. 6, and back again to said rest position.

In the apparatus shown, the cones D—D' are carried by two arms 13a—13b extending from the upper end of a strong rigid vertical rack bar 14 mounted to slide in guideway 15 on frame f. Rack 14 is reciprocated to lower and raise the cones by a pinion 16 on a shaft journalled in frame f and having a crank arm 17 for rotating the gear 16 in forward and reverse motions thereby to move the rack 14 up and down in the guideway 15 over the determined length of vertical travel of the cones D—D'.

The movement of rack 14 and cones D—D' along the prescribed vertical path has been utilized by me in performing automatically the operations of feeding the fruit one at a time to cutting position, cutting the fruit, spreading the cut fruit, locating the spread halves in squeezing position, and after squeezing the halves, ejecting the squeezed halves. The means for accomplishing these operations now will be described.

The cutting of the fruit is accomplished by a V-shaped knife means K having a cutting edge located along the inner V-edge, acting in cooperation with moving cones D—D'. The knife means K is sustained, knife edge up, by frame f in a vertical plane midway between the cones C—C' and D—D' and at a horizontal level locating the knife means adjacent the upper end of the path of travel of cones D—D' but in spaced relation to the bottom edges of cones D—D' when in upper rest position permitting the location of a citrus fruit, such as an orange O, thereon. The horizontal spaced relation of cones C—C' and D—D' is preferably such as to locate the cone edges of cones D—D' closely adjacent, but clearing, the knife means K while traversing the prescribed vertical path of movement provided.

With this arrangement, an orange O disposed on knife means K will be engaged by the peripheral edges of cones D—D' and will be forced by the said cones D—D' against the edge of the knife means K as the cones D—D' move from upper rest position to a position below the knife means K, thereby cutting the orange O in two halves ($O_1$—$O_2$).

Immediately below the knife means K, I provide a spreader means to deflect the cut halves $O_1$—$O_2$ of the orange O, under the descending cones D—D' and onto split platform P—P', cut face down and in a position relative to the cones C—C' to be subjected to a squeezing action on further downward movement of cones D—D'. Most desirably, and as shown, the spreader means comprises a pair of pivotally mounted and normally vertically depending plates $20a$—$20b$ to the bottom of knife means K. As the cones D—D' descend, the plates $20a$ and $20b$ are swung outward to an inclined position as shown in Fig. 5 to serve as spreaders for deflecting the descending orange halves $O_1$—$O_2$ outward beneath the descending cones. Springs $22a$—$22b$ maintain the spreader plates $20a$—$20b$ normally in their vertical position, and the plates are swung outward to their inclined position by vertically movable slides $23a$—$23b$ which are slidably mounted on the knife means and link-connected at their lower ends to the plates and which are moved upward as the cones move downward by latches $24a$—$24b$ actuated by a tripping projection $24'$ at the upper end of the rack 14. The orange halves $O_1$—$O_2$ are urged downwardly along the inclined surfaces of the spread apart plates $20a$—$20b$ by the engaging peripheral edges of the descending cones D—D' and thence onto platform P—P'.

Platform P—P' is provided to locate the orange halves $O_1$—$O_2$ in horizontal position under cones D—D' and centered over cones C—C' in a position to be subjected to the desired squeezing action therebetween on further movement of cones D—D' to nesting position on cones C—C'. Platform P—P', after performing this function, must then be moved from its normal rest position to a position permitting cones D—D' to move to the desired nesting position over cones C—C'.

To accomplish this, the two sections of the platform P—P' are mounted to be movable downwardly and outwardly along a path of travel substantially parallel to the cone surface of cones C—C'. Most desirably, and as shown, the ends of the platform sections extend into trackways 25—25', and springs 26—26' acting in cooperation with suitable stop means 27—27' maintain the platform sections normally in rest position at the desired horizontal level relative to cones C—C'. The descending cones D—D' operate to push platform sections downward and outward against the action of the springs 26—26', and the springs operate to return the platform sections to rest position, the sections following the cones D—D' as the cones are moved upward. By locating the inner platform edges closely adjacent the cone surface of cones C—C', as by providing arcuate recesses therein substantially as shown, the platform sections on their upward movement act to strip the squeezed orange halves $O_1$—$O_2$ from the cones C—C', the said halves $O_1$—$O_2$ when platform P—P' assumes rest position being sustained thereon in a position to be manually or automatically removed from the device.

I prefer to automatically eject the squeezed fruit halves $O_1$—$O_2$ from the device. This operation is performed by ejector means which essentially comprises a pivoted lever, the long arm 30—30' of which is held by springs 31—31' in one position and actuated by tripper means 32—32' engaging the short arm 33—33' of the pivoted lever during the upward movement of cones D—D' to move the long arm 30—30' to engage the orange halves $O_1$—$O_2$ on platform P—P' and push the same therefrom. As tripper means 32—32' clears the arm 33—33' springs 31—31' operate to return the lever to rest position.

To facilitate the production of fruit juice on a relatively large scale basis, means is provided to feed automatically a plurality of oranges O onto the knife means K one at a time and sequentially at intervals controlled by the periodicity of the reciprocation of cones D—D'. This means comprises, as shown, a hopper H sustained on frame $f$, the hopper H being provided with a gravity feed chute G to conduct oranges therefrom to the knife means K, the discharge end of the chute G being provided with a gate 40 arranged to be moved from closed to open position by cones D—D' as the said cones are being moved upwardly to rest position and to move from open to closed position as the cones D—D' are moved downwardly from rest position.

Gravity feed chute G preferably is triangular in section to facilitate the rolling movement of oranges gravitationally therealong. As shown, chute G is comprised of a plurality of wires W with the hopper H also constructed of wires and being substantially circular in cross-section.

Gate 40 is formed by a bar provided with two vertically extending rods 41—41' slidable in guideways 42—42' on the frame $f$. The ends of the bar 40 extend in position to be engaged by the upper surfaces of cones D—D' so that the gate 40 is lifted by the cones D—D' as they move upwardly to their highest rest position, thereby to permit an orange O to pass from the chute G onto the knife means K. Preferably the spaced relation of the discharge end of the chute G to the knife means K is such that the next following orange in the chute G is moved forwardly to discharge position and is retained there by the orange O on the knife means K until the gate means 40 is lowered by the descending cones D—D' into closing position.

To maintain orange O on knife means K during the time interval between its discharge from the chute G and the engagement of the same by descending cones D—D', side guide flaps 50—50' are provided which are pivotally mounted as indicated at 51—51' to be movable downwardly or upwardly out of the path of travel of cones D—D' by engagement of cones D—D' therewith, but are provided with spring tension means 52—52' operative to return the same to horizontal position after the cones D—D' have cleared the same in either direction. The pivotal mounting of guide flaps 50—50' preferably is such as to provide for horizontal adjustment of the spacing therebetween to adapt the same for use with oranges of different diameters.

In operation, the device of the present invention functions substantially as follows:

Hopper H being filled with oranges, cones D—D' are moved to the highest horizontal position to open gate 40 permitting an orange O to gravitationally feed along chute G onto the knife means K. Cones D—D' are then moved downwardly by rotation of gear 16 by crank arm 17 to engage the upper surfaces of the orange O on opposite sides of the knife means K and on further movement downwardly to force the orange O against the edge of the knife means K, cutting the orange O in half and at the same time lowering gate 40 to close the discharge opening of chute G against the discharge of the next following orange O onto knife means K.

As the arm 14 moves downwardly, spreader plates 20a and 20b are swung outward, deflecting the cut halves of the orange onto platform P—P' under cones D—D' and in centered position over cones C—C'.

Upon further downward movement of cones D—D', the platform sections P—P' are moved downwardly and outwardly against the tension of springs 26—26' and the orange halves $O_1$—$O_2$ are subjected to the squeezing action incident to the nesting engagement of cones C—C' and D—D'.

The juice obtained during this squeezing action is discharged or drained through perforations 10 in cones C—C' and is collected in catch basin 11, draining therefrom through drainage spout 12 into a container, such as a glass as shown in Fig. 3.

The downward movement of cones D—D' preferably is adjusted so that the spaced relation between cones D—D' and C—C' in nesting position is such that the minimum amount of oil extraction is obtained from the orange skin. On the return movement of cones D—D', platform P—P' on its return to rest position strips the squeezed orange halves $O_1$—$O_2$ from the cones C—C' and raises the same to a horizontal level above the cones C—C' and in a position to be ejected therefrom by the ejector means 30—30' as it is actuated by tripper means 32—32'. As the cones D—D' return to the highest horizontal level, gate 40 is raised and another orange O is discharged onto the knife means K, and on the next reciprocation of cones D—D' this orange will be cut in half, the two halves squeezed and the squeezed halves discharged from the device as hereinabove described. This sequence of operations may be repeated on a plurality of oranges O, as desired. Alternatively, it involves no departure from the present invention to reciprocate cones D—D' along the path of travel provided by means other than the manually operative means shown.

From the above description of the present invention, it is believed apparent that apparatus embodying the same may be widely modified from that shown without essential departure therefrom, and that the same may be adapted to the extraction of juice from any citrus fruit by a proper design and spacing of the cones C—C' and D—D'. With any given citrus fruit, for example, oranges, the device may be adapted to squeeze the juice from oranges of varying diameters. All such modifications and adaptations of the present invention, however, are contemplated as may fall within the scope of the following claims.

What is claimed is:

1. In a citrus fruit de-juicing apparatus, the combination of a pair of male cone members stationarily mounted in horizontal spaced relationship and a pair of complementary shaped female cone members movably mounted in corresponding horizontal spaced relation and normally held at a rest position at a horizontal level above the said male cones with the cone axes in substantial vertical alignment, means to move the said female cone members simultaneously from said rest position vertically downwardly to nesting position on said male cone members and to return the same to said rest position, a knife means having a cutting edge extending along a V-shaped notch disposed in a vertical plane at right angles to and midway between the cones of the two said pairs of cone members at a horizontal level below the rest position of said female cone members and above the said male cone members with the said cutting edge facing upwardly, means to dispose a citrus fruit on said knife means, means on said female cone members to engage the upper surface of said citrus fruit as the said female cone members are moved downwardly, thereby to force the said citrus fruit over the said knife edge cutting the same in half, and means below the said knife means but above the said stationary male cone members to direct the cut halves of the said fruit to a horizontal squeezing position under the descending female cone members and over the said male cone members.

2. In a citrus fruit de-juicing apparatus, the combination of a pair of male cone members stationarily mounted in horizontal spaced relation and a pair of complementary shaped female cone members movably mounted in corresponding horizontal spaced relation and normally held at a rest position at a horizontal level above the said male cones with the cone axes in substantial vertical alignment, means to move the said female cone members simultaneously from said rest position vertically downwardly to nesting position on said male cone members and to return the same to said rest position, a knife means having a cutting edge extending along a V-shaped notch disposed in a vertical plane at right angles to and midway between the cones of the two said pairs of cone members at a horizontal level below the rest position of said female cone members and above the said male cone members with the said cutting edge facing upwardly, means to dispose a citrus fruit on said knife means, the spaced relation of each pair of said cone members being adapted to bring the bottom cone edges of the female cone members into engagement with the upper surface of said citrus fruit as the said female cone members are moved downwardly thereby to force the said citrus fruit over the said knife edge, cutting the same in half, and means below the said knife means but above the said stationary male cone members to direct the cut halves of the said fruit to a horizontal squeezing position under the descending female cone members and over the said male cone members, and means to strip the squeezed halves of said fruit from the said cone members and to eject the said halves from the device.

3. In a citrus fruit de-juicing apparatus, a pair of male cones and a pair of female cones, means to sustain the said male cones in relatively close spaced horizontal relationship, means to movably sustain the said female cones in similar close spaced relation in a rest position at a horizontal level above the said male cones with the cone axes of the male and female cones in substantial vertical alignment, a knife means having a cutting edge extending along a V-shaped notch sustained midway between the cones of the said pairs of male and female cones at a horizontal level below the rest position of said female cones but above the horizontal level of said male cones at right angles to the vertical plane of said cone axes and with the said cutting edge facing downwardly, means to reciprocate the said female cones simultaneously from said rest position to nesting position over said male cones and return to said rest position, means operative on the return of said female cones to rest position to feed a citrus fruit onto said knife means, means on each said female cone to engage the said citrus fruit on opposite sides of said knife means as the said female cones are moved downwardly from rest position thereby to force the said fruit over the said cutting edge of the knife means cutting the said fruit in half, and means located immediately below the said knife means to deflect the cut halves of the fruit passing from the said knife means cut face down to squeezing position above the said male cones and under the descending female cones.

4. The combination of claim 3, wherein said last mentioned means comprises a pair of deflecting plates hingedly sustained to hang vertically on opposite sides of said knife means and operatively connected to be moved outwardly about its hinge axis to a deflecting position as the said female cones are moved downwardly past the said knife means, and wherein a horizontally sustained receiving platform is provided below said deflecting plates to receive said cut halves from said deflecting plates and to locate the said halves over the said male cones, said platform being provided with sustaining means adapting the same to be moved from its horizontal position to a position permitting the said female cones to assume nesting position over the said male cones and to be returned to said horizontal position upon the return movement of said female cones to rest position, and means operative upon the return of said female cones to a horizontal level above the said male cones to strip the squeezed halves from the said male cones and to eject the said halves from the device.

TALBERT G. NELSON.